(12) United States Patent
Iba et al.

(10) Patent No.: US 7,800,842 B2
(45) Date of Patent: Sep. 21, 2010

(54) PHOTOGRAPHY LENS

(75) Inventors: Takumi Iba, Kyoto (JP); Nami Nagamori, Osaka (JP)

(73) Assignee: Panasonic Corporation, Osaka (JP)

( * ) Notice: Subject to any disclaimer, the term of this patent is extended or adjusted under 35 U.S.C. 154(b) by 4 days.

(21) Appl. No.: 12/446,542

(22) PCT Filed: Feb. 19, 2008

(86) PCT No.: PCT/JP2008/000270

§ 371 (c)(1),
(2), (4) Date: Apr. 21, 2009

(87) PCT Pub. No.: WO2008/114485

PCT Pub. Date: Sep. 25, 2008

(65) Prior Publication Data

US 2010/0188758 A1 Jul. 29, 2010

(30) Foreign Application Priority Data

Mar. 16, 2007 (JP) ............................ 2007-069050

(51) Int. Cl.
- *G02B 9/14* (2006.01)
- *G02B 13/08* (2006.01)
- *G02B 3/02* (2006.01)

(52) U.S. Cl. ...................... 359/785; 359/716
(58) Field of Classification Search ................. 359/785, 359/716, 690

See application file for complete search history.

(56) References Cited

U.S. PATENT DOCUMENTS

| 2003/0184883 A1 | 10/2003 | Sato et al. |
| 2003/0193605 A1 | 10/2003 | Yamaguchi |
| 2004/0179275 A1 | 9/2004 | Takeuchi et al. |
| 2007/0070526 A1 | 3/2007 | Sato |
| 2007/0217034 A1* | 9/2007 | Taniyama ............... 359/785 |
| 2007/0229987 A1 | 10/2007 | Shinohara |

FOREIGN PATENT DOCUMENTS

JP 2003-255222 9/2003

(Continued)

*Primary Examiner*—Alicia M Harrington
(74) *Attorney, Agent, or Firm*—Hamre, Schumann, Mueller & Larson, P.C.

(57) ABSTRACT

A photography lens 6 includes: an aperture stop 4; a first lens 1 having positive refractive power, and at least one of the lens surfaces is aspherical; a second lens 2 having negative refractive power, and at least one of the lens surfaces is aspherical; and a third lens 3 having positive refractive power, and both lens surfaces are aspherical, arranged in that order from an object side to an image surface side. When f indicates the focal length of the entire optical system, f1 indicates the focal length of the first lens 1, f2 indicates the focal length of the second lens 2, r21 indicates the radius of curvature of the lens surface of the second lens 2 facing the object side, and n2 indicates the refractive index of the second lens 2, the following conditional expressions (1) to (3) are satisfied:

$$0.8 < f1/f < 0.9 \tag{1}$$

$$-1.0 < f2/f < 0.7 \tag{2}$$

$$-1.0 < r21/((n2-1) \cdot f) < -0.7. \tag{3}$$

Thus, it is possible to provide a bright photography lens having high performance and an F number of 3.5 or less. The photography lens can be small and thin, and it can be manufactured at low cost, and it is compatible with a high pixel imaging element of a megapixel or more incorporated in a small mobile product such as a mobile phone.

5 Claims, 6 Drawing Sheets

FOREIGN PATENT DOCUMENTS

| | | |
|---|---|---|
| JP | 2004-4566 | 1/2004 |
| JP | 2004-212467 | 7/2004 |
| JP | 2006-106321 | 4/2006 |
| JP | 2006-133270 | 5/2006 |
| JP | 2007-94113 | 4/2007 |
| JP | 2007-264181 | 10/2007 |

* cited by examiner

PHOTOGRAPHY LENS

TECHNICAL FIELD

The present invention relates to a photography lens suited for a small mobile product such as a mobile phone equipped with an imaging device.

BACKGROUND ART

In recent years, small mobile products equipped with an imaging device (camera module), e.g., mobile phones, have become widely popular, and taking a picture instantly with the small mobile product has become a common practice. As a photography lens for a small imaging device incorporated in the small mobile product, a photography lens configured with three lens groups including: a first lens as a first lens group; a second lens as a second lens group; and a third lens as a third lens group, arranged in that order from an object side to an image surface side, has been becoming popular. This is because its performance can be enhanced further in comparison with a photography lens configured with one or two lenses (e.g., see Patent Documents 1 and 2).

The photography lens described in Patent Document 1 includes: an aperture stop; a first lens having positive refractive power whose lens surface facing the object side is convex (first lens group); a second lens having positive refractive power whose lens surface facing the object side is concave (second lens group); and a third lens having negative refractive power whose lens surface facing the object side is convex (third lens group), arranged in that order from the object side to the image surface side. The first lens is configured as a glass lens, and the second and the third lenses are configured as plastic lenses. The reason for using a glass lens as the first lens is to correct, in particular, longitudinal chromatic aberration and lateral chromatic aberration favorably.

However, as described above, since a glass lens is used as the first lens in the photography lens described in Patent Document 1, the manufacturing cost is increased. Further, the configuration described in Patent Document 1 results in a dark photography lens having a large F number.

The photography lens described in Patent Document 2 intends to solve the problems of the photography lens described in Patent Document 1, and includes: an aperture stop; a first lens having a double-convex shape and positive refractive power (first lens group); a second lens having negative refractive power whose lens surface facing the object side is concave (second lens group); and a third lens having a meniscus shape whose lens surface facing the object side is convex (third lens group), arranged in that order from the object side to the image surface side. The first to the third lenses are all configured as plastic lenses.

As described above, the photography lens described in Patent Document 2 includes the first to the third lenses that are all configured as plastic lenses, therefore suitable for a mass production at low manufacturing cost. However, aberrations cannot be corrected sufficiently only with the above lens configuration, and thus the photography lens is not compatible with a high pixel imaging element of a megapixel or more. Further, since the configuration described in Patent Document 2 results in an increase in the total length of the optical system, downsizing and thinning of the photography lens become difficult to accomplish.

For example, Patent Document 3 proposes a bright photography lens having a small F number that is compatible with a high pixel imaging element of a megapixel or more.

The photography lens described in Patent Document 3 includes: an aperture stop; a cemented lens made of a first lens having positive refractive power and a second lens having negative refractive power (first lens group); a third lens as a meniscus lens in which at least one of the lens surfaces is aspherical and the lens surface facing the object side is concave (second lens group); and a fourth lens as a meniscus lens in which at least one of the lens surfaces is aspherical and the lens surface facing the object side is convex (third lens group), arranged in that order from the object side to the image surface side (configured with three lens groups including four lenses). The first and the second lenses are configured as glass lenses, and the third and the fourth lenses are configured as plastic lenses.

Patent Document 1: JP 2004-212467 A

Patent Document 2: JP 2004-4566 A

Patent Document 3: JP 2003-255222 A

DISCLOSURE OF INVENTION

Problem to be Solved by the Invention

However, the first lens group of the photography lens described in Patent Document 3 is formed of a cemented lens consisting of two glass lenses. Thus, the manufacturing cost is further increased in comparison with that of the photography lens described in Patent Document 1. Further, since the photography lens described in Patent Document 3 is configured with three lens groups including four lenses, the total length of the optical system is increased, and thereby, similarly to the photography lens described in Patent Document 2, downsizing and thinning of the photography lens become difficult to carry out.

In order to solve the aforementioned problems in the conventional techniques, it is an object of the present invention to provide a bright photography lens having high performance and an F number of 3.5 or less. The photography lens can be small and thin, and it can be manufactured at low cost, and it is compatible with a high pixel imaging element of a megapixel or more incorporated in a small mobile product such as a mobile phone.

Means for Solving Problem

In order to achieve the above object, the photography lens according to the present invention includes: an aperture stop; a first lens having positive refractive power, and at least one of the lens surfaces is aspherical; a second lens having negative refractive power, and at least one of the lens surfaces is aspherical; and a third lens having positive refractive power, and both lens surfaces are aspherical, arranged in that order from an object side to an image surface side. The first lens is configured as a meniscus lens whose lens surface facing the object side is convex with higher refractive power than the lens surface facing the image surface side. The lens surface of the second lens facing the object side is concave. The third lens is configured as a meniscus lens whose lens surface facing the object side is convex. When f indicates the focal length of the entire optical system, f1 indicates the focal length of the first lens, f2 indicates the focal length of the second lens, r21 indicates the radius of curvature of the lens surface of the second lens facing the object side, and n2 indicates the refractive index of the second lens, the following conditional expressions (1) to (3) are satisfied.

$$0.8 < f1/f < 0.9 \quad (1)$$

$$-1.0 < f2/f < -0.7 \quad (2)$$

$$-1.0 < r21/((n2-1) \cdot f) < -0.7 \quad (3)$$

The conditional expressions (1) and (2) relate to the refractive power balances of the first and the second lenses with respect to the entire optical system. An increase in the refractive power of the first lens can be avoided if the value exceeds the lower limit of the conditional expression (1), and a decrease in the refractive power of the first lens can be avoided if the value falls below the upper limit of the conditional expression (1). Further, an increase in the refractive power of the second lens can be avoided if the value falls below the upper limit of the conditional expression (2), and a decrease in the refractive power of the second lens can be avoided if the value exceeds the lower limit of the conditional expression (2).

By using the first and the second lenses in which at least one of the lens surfaces is aspherical, and by satisfying the conditional expressions (1) and (2), spherical aberration, coma aberration and astigmatism essentially can be corrected favorably. Moreover, it also becomes possible to provide a bright photography lens that has an F number of 3.5 or less in spite of its compact size (the total length of the optical system is small). If the refractive power of the first lens or the second lens is increased with respect to the refractive power balance given by the conditional expression (1) or (2), spherical aberration, coma aberration and astigmatism increase mainly, and favorable correction of these aberrations becomes difficult.

The conditional expression (3) relates to the refractive power of the lens surface of the second lens facing the object side with respect to the entire optical system. An increase in the refractive power of the lens surface of the second lens facing the image surface side can be avoided if the value falls below the upper limit of the conditional expression (3). Thus, spherical aberration, coma aberration and astigmatism essentially can be corrected favorably. Further, a decrease in the refractive power of the lens surface of the second lens facing the image surface side can be avoided if the value exceeds the lower limit of the conditional expression (3). Thereby, a positive Petzval sum can be reduced, and field curvature can be corrected favorably.

Further, by configuring the third lens with a meniscus lens having positive refractive power in which both lens surfaces are aspherical, and the lens surface facing the object side is convex, mainly astigmatism and distortion can be corrected favorably. Meanwhile, if the third lens does not have such a configuration, favorable correction of astigmatism and distortion becomes difficult to carry out while keeping the total length of the optical system small.

As described above, according to the configuration of the photography lens of the present invention, it is possible to provide a high-performance photography lens that can be made compact (downsized, thinned), and with which various aberrations can be corrected favorably. The photography lens is compatible with a high pixel imaging element of a megapixel or more incorporated in a small mobile product such as a mobile phone. Furthermore, according to the configuration of the photography lens of the present invention, the photography lens is compatible with a high pixel imaging element of a megapixel or more, regardless of its lens material. Thus, a cost can be reduced by using plastic as the lens material.

In the configuration of the photography lens of the present invention, it is preferable that a diffractive optical element surface is formed on the lens surface of the first lens facing the image surface side or the lens surface of the second lens facing the image surface side. According to this preferable example, not only the various aberrations described above but also chromatic aberration can be corrected.

Further, in the configuration of the photography lens of the present invention, it is preferable that each of the first to the third lenses is a plastic lenses. According to this preferable example, molding of the first to the third lenses, including providing an aspherical shape and a diffractive optical element surface, can be carried out readily. In addition, it is advantageous also in terms of the material cost, and by extension the manufacturing cost.

Further, in the configuration of the photography lens of the present invention, when TL indicates the total length of the optical system, it is preferable that the following conditional expression (4) is satisfied.

$$TL/f < 1.25 \quad (4)$$

The conditional expression (4) expresses compactness (the total length of the optical system is small) mathematically. By incorporating a photography lens that satisfies the conditional expression (4) into a mobile product such as a mobile phone, the mobile product can be downsized and thinned.

Effects of the Invention

As described above, according to the present invention, it is possible to provide a bright photography lens having high performance and an F number of 3.5 or less. The photography lens can be small and thin, and it can be manufactured at low cost, and it is compatible with a high pixel imaging element of a megapixel or more incorporated in a small mobile product such as a mobile phone.

BRIEF DESCRIPTION OF DRAWINGS

FIG. 2B is a graph showing astigmatism and FIG. 3C is a graph showing distortion.

FIG. 4 shows aberration graphs of a photography lens in Example 2 of the present invention.

FIG. 6 shows aberration graphs of a photography lens in Example 3 of the present invention.

DESCRIPTION OF THE INVENTION

Hereinafter, the present invention will be described more specifically by way of embodiments.

First Embodiment

Figure 1:
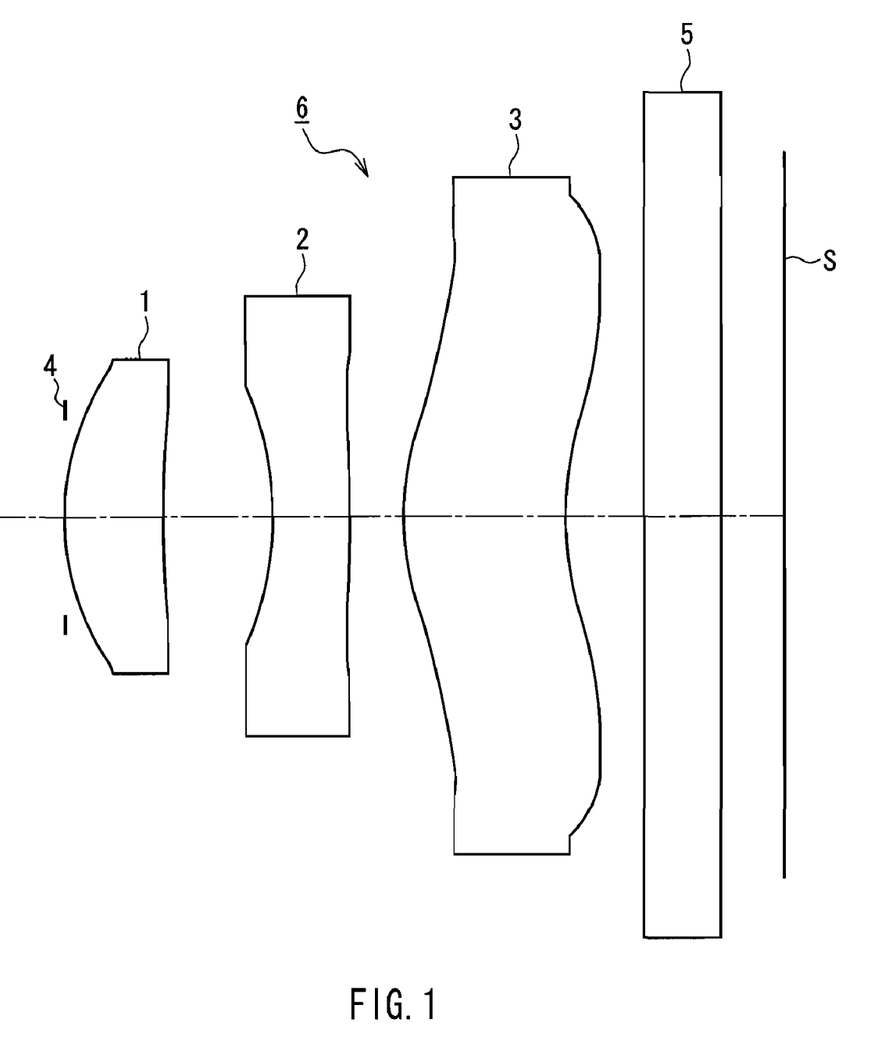
FIG. 1 is a diagram showing a layout of a photography lens according to a first embodiment of the present invention.

FIG. 1 is a diagram showing a layout of a photography lens according to a first embodiment of the present invention.

As shown in FIG. 1, a photography lens 6 of the present embodiment includes: an aperture stop 4; a first lens 1 having positive refractive power, and at least one of the lens surfaces is aspherical; a second lens 2 having negative refractive power, and at least one of the lens surfaces is aspherical; and a third lens 3 having positive refractive power, and both lens surfaces are aspherical, arranged in that order from an object side (left side of FIG. 1) to an image surface side (right side of FIG. 1). The photography lens 6 is an imaging single focus lens for forming an optical image for an imaging element (e.g., CCD).

The aspherical shape of the lens surfaces will be given by Formula 1 (the same applies to second and third embodiments described below).

$$X = \frac{Y^2/R}{1+\sqrt{1-(1+\kappa)(Y/R)^2}} + A4Y^4 + A6Y^6 + A8Y^8 + A10Y^{10}$$ [Formula 1]

In Formula 1, Y indicates the height from the optical axis, X indicates the distance from the tangent plane to the vertex of the aspherical surface of the aspherical shape at a height Y from the optical axis, R indicates the radius of curvature of the vertex of the aspherical surface, κ indicates conic constant, and A4, A6, A8 and A10 indicate fourth-, sixth-, eighth- and tenth-order aspherical coefficients, respectively.

The first lens 1 is configured as a meniscus lens whose lens surface facing the object side is convex with higher refractive power than the lens surface facing the image surface side.

The lens surface of the second lens 2 facing the object side is concave.

The third lens 3 is configured as a meniscus lens whose lens surface facing the object side is convex.

The photography lens 6 of the present embodiment is configured to satisfy the following conditional expressions (1) to (3).

$$0.8 < f1/f < 0.9 \quad (1)$$

$$-1.0 < f2/f < -0.7 \quad (2)$$

$$-1.0 < r21/((n2-1) \cdot f) < -0.7 \quad (3)$$

Here, f indicates the focal length of the entire optical system, f1 indicates the focal length of the first lens 1, f2 indicates the focal length of the second lens 2, r21 indicates the radius of curvature of the lens surface of the second lens 2 facing the object side, and n2 indicates the refractive index of the second lens 2.

The conditional expressions (1) and (2) relate to the refractive power balances of the first lens 1 and the second lens 2 with respect to the entire optical system. An increase in the refractive power of the first lens 1 can be avoided if the value exceeds the lower limit of the conditional expression (1), and a decrease in the refractive power of the first lens 1 can be avoided if the value falls below the upper limit of the conditional expression (1). Further, an increase in the refractive power of the second lens 2 can be avoided if the value falls below the upper limit of the conditional expression (2), and a decrease in the refractive power of the second lens 2 can be avoided if the value exceeds the lower limit of the conditional expression (2).

By using the first lens 1 and the second lens 2 in which at least one of the lens surfaces is aspherical, and by satisfying the conditional expressions (1) and (2), spherical aberration, coma aberration and astigmatism essentially can be corrected favorably. Moreover, it also becomes possible to provide a bright photography lens that has an F number of 3.5 or less in spite of its compact size (the total length of the optical system is short). If the refractive power of the first lens 1 or the second lens 2 is increased with respect to the refractive power balance given by the conditional expression (1) or (2), spherical aberration, coma aberration and astigmatism mainly increase, and favorable correction of these aberrations becomes difficult.

The conditional expression (3) relates to the refractive power of the lens surface of the second lens 2 facing the object side with respect to the entire optical system. An increase in the refractive power of the lens surface of the second lens 2 facing the image surface side can be avoided if the value falls below the upper limit of the conditional expression (3). Thus, spherical aberration, coma aberration and astigmatism essentially can be corrected favorably. Further, a decrease in the refractive power of the lens surface of the second lens 2 facing the image surface side can be avoided if the value exceeds the lower limit of the conditional expression (3). Thereby, a positive Petzval sum can be reduced, and field curvature can be corrected favorably.

Further, by configuring the third lens 3 with a meniscus lens that has positive refractive power, both of the lens surfaces are aspherical and the lens surface facing the object side is convex, astigmatism and distortion can be corrected favorably. Meanwhile, if the third lens 3 does not have such a configuration, favorably correcting astigmatism and distortion becomes difficult while keeping the total length of the optical system small.

As described above, according to the configuration of the photography lens 6 of the present embodiment, it is possible to provide a high-performance photography lens that can be made compact (downsized, thinned), and with which various aberrations can be corrected favorably. The photography lens is also compatible with a high pixel imaging element of a megapixel or more incorporated in a small mobile product such as a mobile phone. Further, as will become apparent from Example 1 described below, according to the configuration of the photography lens 6 of the present embodiment, it is also possible to provide a bright photography lens having an F number of 3.5 or less.

A transparent parallel plate 5 is disposed between the third lens 3 and an imaging surface S of the imaging element. Here, the parallel plate 5 is a plate that is equivalent to an optical low-pass filter, an IR-cut filter and a faceplate (glass cover) of the imaging element.

Respective surfaces from the lens surface of the first lens 1 facing the object side to the surface of the parallel plate 5 facing the image surface side (hereinafter also referred to as "optical surfaces") will be referred to as, from the object side, a "first surface", a "second surface", a "third surface" . . . and an "eighth surface" (the same applies to the second and the third embodiments described below).

In the photography lens 6 of the present embodiment, it is preferable that each of the first lens 1 to the third lens 3 is a plastic lens. If the first lens 1 to the third lens 3 are plastic molded products, molding of the first lens 1 to the third lens 3, including providing an aspherical shape, can be carried out readily. In addition, it is advantageous also in terms of the material cost, and by extension the manufacturing cost.

Preexisting materials such as polymethyl methacrylate (PMMA), a polycarbonate resin (PC), cyclic olefin polymer, a styrene-based resin, a polystyrene resin (PS) and a low moisture absorbing acrylic resin can be used as the material of the plastic lenses.

Further, it is preferable that the photography lens 6 of the present embodiment satisfies the following conditional expression (4).

$$TL/f < 1.25 \quad (4)$$

Here, TL indicates the total length of the optical system (hereinafter also referred to as "the optical total length"), which is the length from the front face of the aperture stop 4 facing the object side to the imaging surface S of the imaging element.

The conditional expression (4) expresses compactness (the total length of the optical system is small) mathematically. By incorporating the photography lens 6 that satisfies the conditional expression (4) into a mobile product such as a mobile phone, the mobile product can be downsized and thinned.

Example 1

Hereinafter, the photography lens of the present embodiment will be described more specifically by way of a specific example.

Table 1 shows a specific numerical example of the photography lens in this example.

TABLE 1

| Surface number | r (mm) | d (mm) | n | ν |
|---|---|---|---|---|
| Object | | Infinite | | |
| Aperture stop | ∞ | 0.00 | — | — |
| First surface | 1.520 | 0.640 | 1.5247 | 56.38 |
| Second surface | 13.440 | 0.690 | — | — |
| Third surface | −2.040 | 0.500 | 1.607 | 27.59 |
| Fourth surface | 73.030 | 0.350 | — | — |
| Fifth surface | 1.238 | 1.040 | 1.5247 | 56.38 |
| Sixth surface | 1.781 | 0.500 | — | — |
| Seventh surface | ∞ | 0.500 | 1.5168 | 64.2 |
| Eighth surface | ∞ | 0.378 | — | — |
| Image surface | ∞ | — | — | — |

In Table 1, r (mm) indicates the radius of curvature of each optical surface, d (mm) indicates the thickness or the distance between each pairs of adjacent surfaces of the first lens 1 to the third lens 3 and the parallel plate 5 on an optical axis, n indicates the refractive index of each of the first lens 1 to the third lens 3 and the parallel plate 5 at the d line (587.5600 nm), and ν indicates the Abbe's number of each of the first lens 1 to the third lens 3 and the parallel plate 5 at the d line (the same applies to Examples 2 and 3 described below). The photography lens 6 shown in FIG. 1 is configured on the basis of the data shown in Table 1.

Table 2 shows aspherical coefficients including conic constant of the photography lens in this example. In Table 2, "E+00", "E−02" and the like indicate "$10^{+00}$", "$10^{-02}$" and the like, respectively (the same applies to Examples 2 and 3 described below).

TABLE 2

| | First surface | Second surface | Third surface | Fourth surface | Fifth surface | Sixth surface |
|---|---|---|---|---|---|---|
| κ | −1.1142E+00 | 0.0000E+00 | −2.9771E+00 | 0.0000E+00 | −4.8469E+00 | −1.1269E+00 |
| A4 | 4.1923E−02 | 2.2458E−03 | −4.8174E−02 | −2.8309E−01 | −1.1737E−01 | −1.2645E−01 |
| A6 | 2.8557E−04 | 4.5677E−02 | 1.0974E−01 | 5.1797E−01 | 6.4383E−02 | 2.5148E−02 |
| A8 | 4.4064E−02 | −1.2494E−01 | 1.3026E−02 | −3.2829E−01 | −1.4339E−02 | −1.1578E−03 |
| A10 | −9.3720E−02 | 3.0487E−03 | −2.1438E−01 | 7.8158E−02 | 7.7508E−04 | −3.5930E−04 |

As shown in Table 2, in the photography lens 6 in this example, all the lens surfaces of the first lens 1 to the third lens 3 are aspherical. It should be noted, however, that the photography lens 6 is not necessarily limited to this configuration as long as at least one of the lens surfaces of the first lens 1, one of the lens surfaces of the second lens 2 and both lens surfaces of the third lens 3 are aspherical.

Table 3 shows the F number Fno, the focal length f (mm) of the entire optical system, the angle of view 2 ω (°), the optical total length measured in terms of air TL (mm) and the values of the respective conditional expressions (1) to (4) of the photography lens 6 in this example.

TABLE 3

| Fno | 3.2 |
|---|---|
| f (mm) | 3.84 |
| 2ω (°) | 59.4 |
| TL (measured in terms of air) (mm) | 4.43 |
| Conditional expression (1) f1/f | 0.83 |
| Conditional expression (2) f2/f | −0.84 |
| Conditional expression (3) r21/((n2 − 1) * f) | −0.88 |
| Conditional expression (4) TL/f | 1.15 |

Figure 2A:
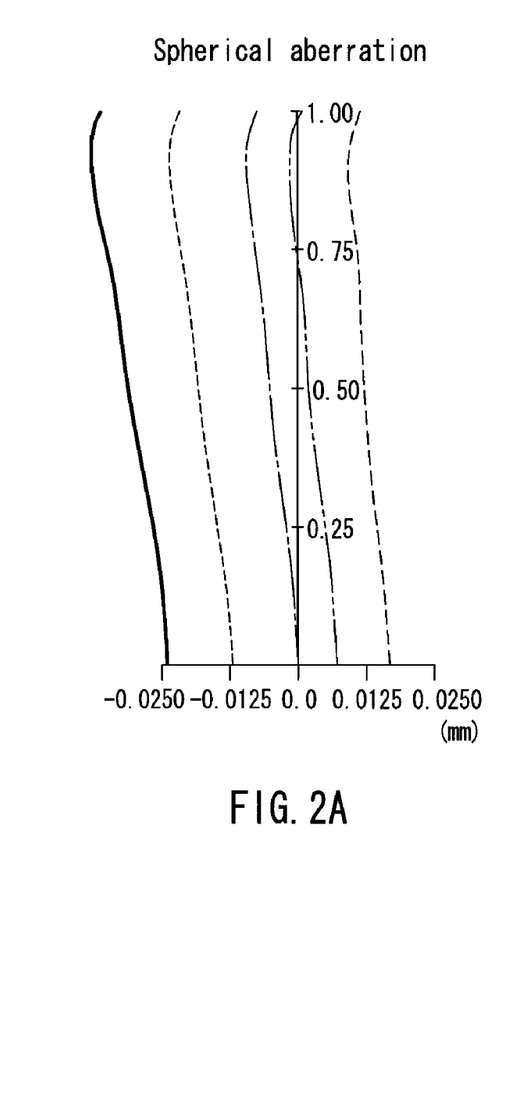
FIG. 2A is a graph showing spherical aberration (longitudinal chromatic aberration)
Figure 2B:
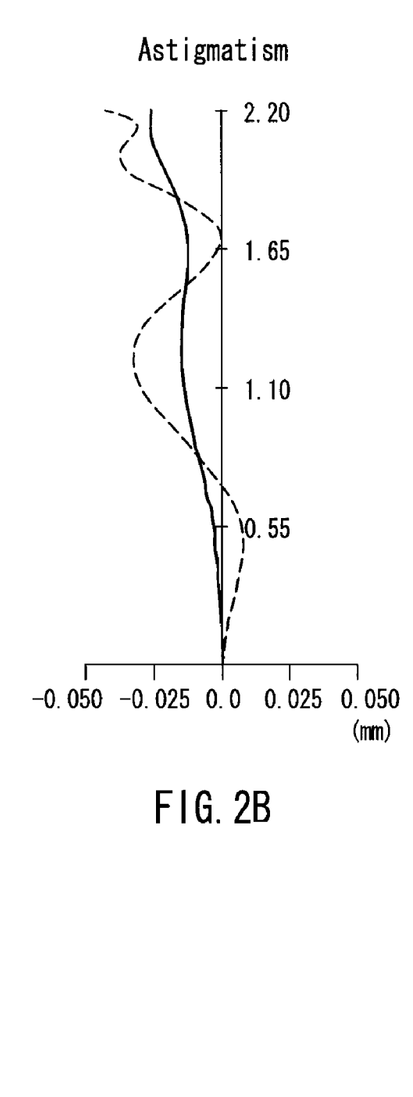
Figure 2C:
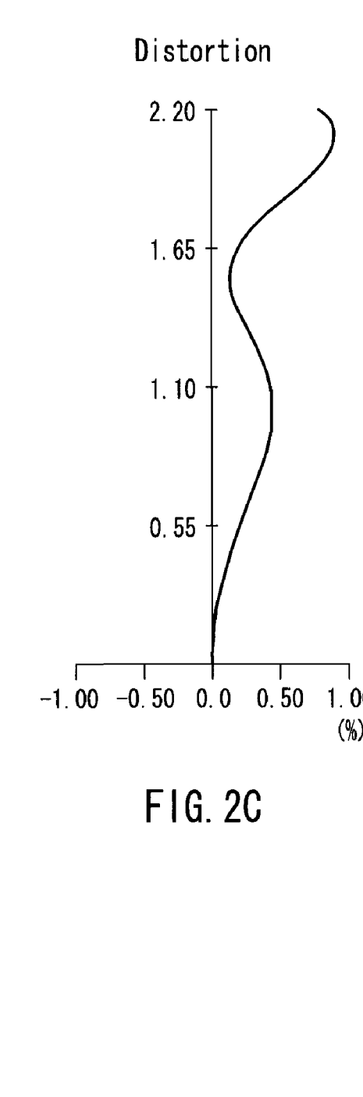
FIG. 2 shows aberration graphs of a photography lens in Example 1 of the present invention.

FIG. 2 shows aberration graphs of the photography lens in this example. FIG. 2A is a graph showing spherical aberration. A solid line indicates values at the g line (435.8300 nm), a short dashed line indicates values at the F line (486.1300 nm), an alternate long and short dashed line indicates values at the e line (546.0700 nm), an alternate long and two short dashed line indicates values at the d line (587.5600 nm), and a long dashed line indicates values at the C line (656.2700 nm) FIG. 2B is a graph showing astigmatism, and a solid line indicates a sagittal field curvature and a dashed line indicates a meridional field curvature. FIG. 2C is a graph showing distortion. A graph of longitudinal chromatic aberration is identical to FIG. 2A showing the spherical aberration.

As is evident from the aberration graphs shown in FIG. 2, various aberrations are corrected favorably, and thus the photography lens 6 in this example is compatible with a high pixel imaging element of a megapixel or more. In addition to this, if the results shown in Table 3 are taken into consideration, it is apparent that a bright photography lens having high performance and an F number of 3.2 is obtained. The photography lens can be small and thin, and it can be manufactured at low cost, and it is compatible with a high pixel imaging element of a megapixel or more incorporated in a small mobile product such as a mobile phone.

Second Embodiment

Figure 3:
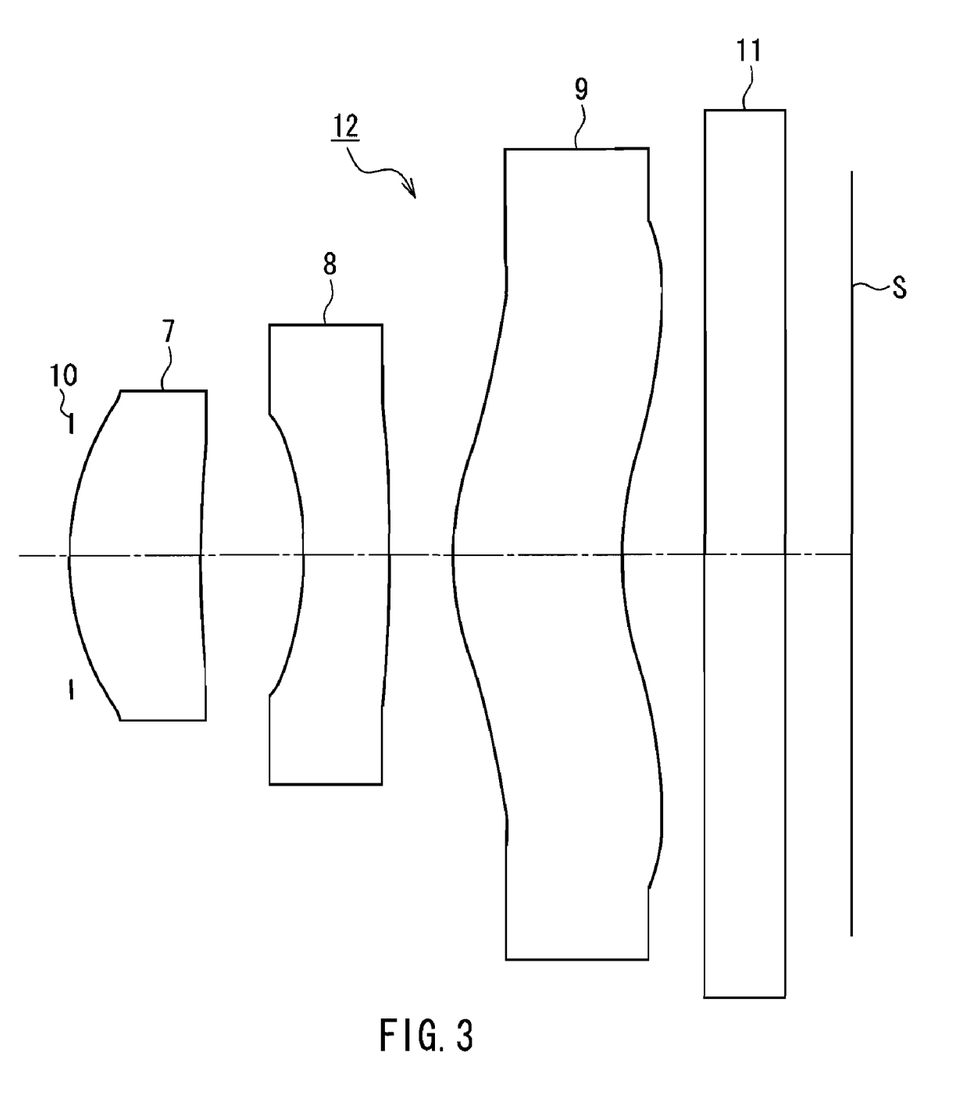
FIG. 3 is a diagram showing a layout of a photography lens according to a second embodiment of the present invention.

FIG. 3 is a diagram showing a layout of a photography lens according to a second embodiment of the present invention.

As shown in FIG. 3, a photography lens 12 of the present embodiment includes: an aperture stop 10; a first lens 7 having positive refractive power, and at least one of the lens surfaces is aspherical; a second lens 8 having negative refractive power, and at least one of the lens surfaces is aspherical; and a third lens 9 having positive refractive power, and both lens surfaces are aspherical, arranged in that order from an object side (left side of FIG. 3) to an image surface side (right side of FIG. 3).

The first lens 7 is configured as a meniscus lens whose lens surface facing the object side is convex with higher refractive power than the lens surface facing the image surface side.

The lens surface of the second lens 8 facing the object side is concave.

The third lens 9 is configured as a meniscus lens whose lens surface facing the object side is convex.

The photography lens 12 of the present embodiment is also configured to satisfy the conditional expressions (1) to (3).

As described above, effects similar to those obtained from the configuration of the photography lens 6 of the first embodiment also can be obtained from the configuration of the photography lens 12 of the present embodiment. That is, according to the configuration of the photography lens 12 of the present embodiment, it is possible to provide a high-performance photography lens that can be made compact (downsized, thinned), and with which various aberrations can be corrected favorably. The photography lens is compatible with a high pixel imaging element of a megapixel or more incorporated in a small mobile product such as a mobile phone. Further, as will become apparent from Example 2 described below, according to the configuration of the photography lens 12 of the present embodiment, it is also possible to provide a bright photography lens having an F number of 3.5 or less.

A transparent parallel plate 11 similar to the parallel plate 5 in the first embodiment is disposed between the third lens 9 and the imaging surface S of the imaging element.

Further, also in the photography lens 12 of the present embodiment, similarly to the photography lens 6 of the first embodiment, it is preferable that each of the first lens 7 to the third lens 9 is a plastic lens.

Further, it is preferable that the photography lens 12 of the present embodiment also satisfies the conditional expression (4).

Example 2

Hereinafter, the photography lens of the present embodiment will be described more specifically by way of a specific example.

Table 4 shows a specific numerical example of a photography lens in this example. The photography lens 12 shown in FIG. 3 is configured on the basis of the data shown in Table 4.

TABLE 4

| Surface number | r (mm) | d (mm) | n | ν |
|---|---|---|---|---|
| Object | | Infinite | | |
| Aperture stop | ∞ | 0.00 | — | — |
| First surface | 1.449 | 0.814 | 1.5247 | 56.38 |
| Second surface | 8.295 | 0.564 | — | — |
| Third surface | −2.098 | 0.500 | 1.607 | 27.59 |
| Fourth surface | 27.010 | 0.354 | — | — |
| Fifth surface | 1.228 | 1.021 | 1.5247 | 56.38 |
| Sixth surface | 1.837 | 0.500 | — | — |
| Seventh surface | ∞ | 0.500 | 1.5168 | 64.2 |
| Eighth surface | ∞ | 0.370 | — | — |
| Image surface | ∞ | — | — | — |

Table 5 shows aspherical coefficients (including conic constant) of the photography lens in this example.

As shown in Table 5, in the photography lens 12 in this example, all the lens surfaces of the first lens 7 to the third lens 9 are aspherical. It should be noted, however, that the photography lens 12 is not necessarily limited to this configuration as long as at least one of the lens surfaces of the first lens 7, one of the lens surfaces of the second lens 8 and both lens surfaces of the third lens 9 is aspherical.

Table 6 shows the F number Fno, the focal length f (mm) of the entire optical system, the angle of view 2 ω(°), the optical total length measured in terms of air TL (mm), and the values of the respective conditional expressions (1) to (4) of the photography lens 12 in this example.

TABLE 6

| | |
|---|---|
| Fno | 2.8 |
| f (mm) | 3.84 |
| 2ω (°) | 59.4 |
| TL (measured in terms of air) (mm) | 4.45 |
| Conditional expression (1) f1/f | 0.83 |
| Conditional expression (2) f2/f | −0.82 |
| Conditional expression (3) r21/((n2 − 1) * f) | −0.90 |
| Conditional expression (4) TL/f | 1.16 |

Figure 4A:
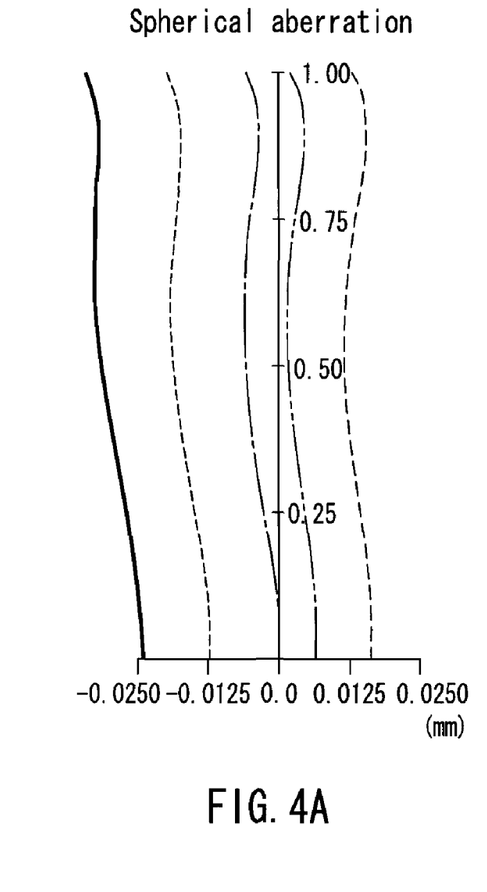
FIG. 4A is a graph showing spherical aberration (longitudinal chromatic aberration)
Figure 4B:
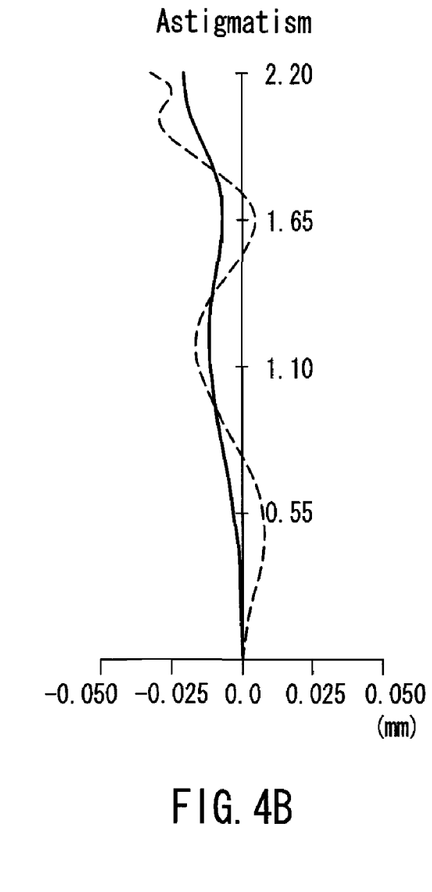
FIG. 4B is a graph showing astigmatism and FIG. 4C is a graph showing distortion.
Figure 4C:
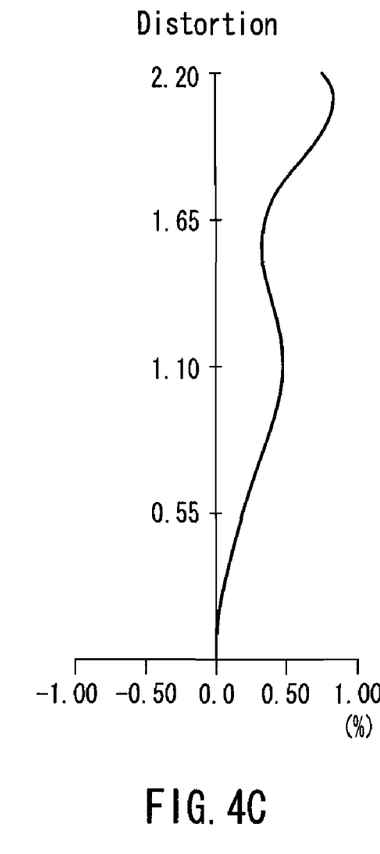

FIG. 4 shows aberration graphs of the photography lens in this example. FIG. 4A is a graph showing spherical aberration. A solid line indicates values at the g line, a short dashed line indicates values at the F line, an alternate long and short dashed line indicates values at the e line, an alternate long and two short dashed line indicates values at the d line, and a long dashed line indicates values at the C line. FIG. 4B is a graph showing astigmatism, and a solid line indicates a sagittal field curvature, and a dashed line indicates a meridional field curvature. FIG. 4C is a graph showing distortion. The graph of longitudinal chromatic aberration is identical to FIG. 4A showing spherical aberration.

As is evident from the aberration graphs shown in FIG. 4, various aberrations are corrected favorably, and thus the photography lens 12 in this example is compatible with a high pixel imaging element of a megapixel or more. In addition to this, if the results shown in Table 6 are taken into consideration, it is apparent that a bright photography lens having high performance and an F number of 2.8 is obtained. The photography lens can be small and thin, and it can be manufactured at low cost, and it is compatible with a high pixel imaging element of a megapixel or more incorporated in a small mobile product such as a mobile phone.

Third Embodiment

Figure 5:
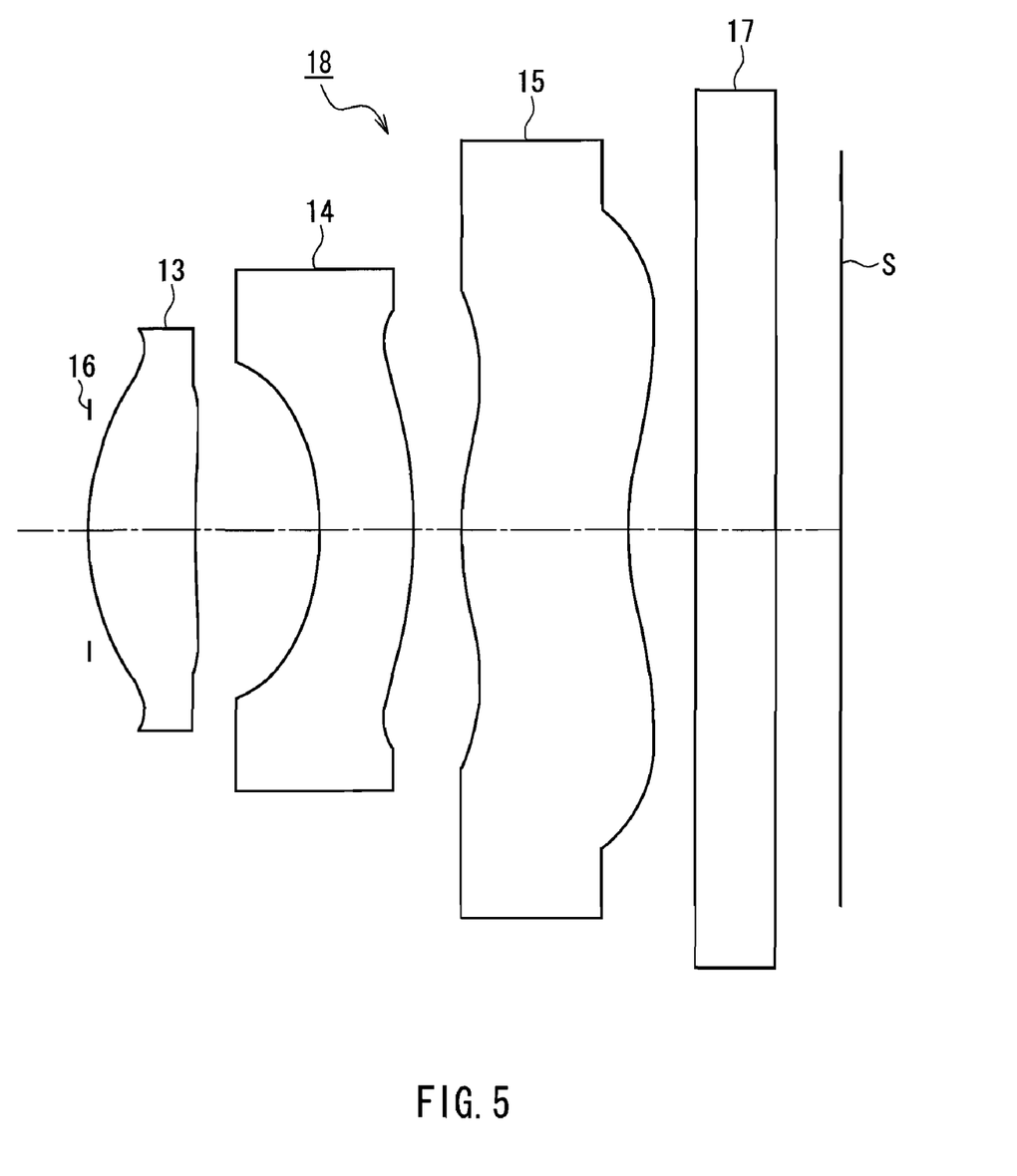
FIG. 5 is a diagram showing a layout of a photography lens according to a third embodiment of the present invention.

FIG. 5 is a diagram showing a layout of a photography lens according to a third embodiment of the present invention.

As shown in FIG. 5, a photography lens 18 of the present embodiment includes: an aperture stop 16; a first lens 13 having positive refractive power, and at least one of the lens surfaces is aspherical; a second lens 14 having negative refractive power, and at least one of the lens surfaces is

TABLE 5

| | First surface | Second surface | Third surface | Fourth surface | Fifth surface | Sixth surface |
|---|---|---|---|---|---|---|
| κ | −1.0582E+00 | 9.8329E+01 | 6.3440E−01 | 0.0000E+00 | −4.8054E+00 | −1.0680E+00 |
| A4 | 4.4765E−02 | −3.0166E−02 | −7.5688E−02 | −3.3319E−01 | −1.1120E−01 | −1.1688E−01 |
| A6 | 5.8946E−03 | −4.1831E−03 | 3.5157E−02 | 5.2758E−01 | 5.9835E−02 | 2.2665E−02 |
| A8 | 4.6221E−03 | −1.0858E−01 | 2.2043E−01 | −3.5004E−01 | −1.3679E−02 | −1.1526E−03 |
| A10 | −2.8979E−02 | −1.0988E−01 | −5.6486E−01 | 9.2702E−02 | 8.6428E−04 | −2.8459E−04 | aspherical; and a third lens 15 having positive refractive power, and both lens surfaces are aspherical, arranged in that order from an object side (left side of FIG. 5) to an image surface side (right side of FIG. 5).

The first lens 13 is configured as a meniscus lens whose lens surface facing the object side is convex with higher refractive power than the lens surface facing the image surface side.

The lens surface of the second lens 14 facing the object side is concave.

The third lens 15 is configured as a meniscus lens whose lens surface facing the object side is convex.

The photography lens 18 of the present embodiment is also configured to satisfy the conditional expressions (1) to (3).

As described above, effects similar to those obtained from the configuration of the photography lens 6 of the first embodiment also can be obtained from the configuration of the photography lens 18 of the present embodiment. That is, according to the configuration of the photography lens 18 of the present embodiment, it is possible to provide a high-performance photography lens that can be made compact (downsized, thinned), and with which various aberrations can be corrected favorably. The photography lens is also compatible with a high pixel imaging element of a megapixel or more incorporated in a small mobile product such as a mobile phone. Further, as will become apparent from Example 3 described below, according to the configuration of the photography lens 18 of the present embodiment, it is also possible to provide a bright photography lens having an F number of 3.5 or less.

A transparent parallel plate 17 similar to the parallel plate 5 in the first embodiment is disposed between the third lens 15 and the imaging surface S of the imaging element.

Further, in the photography lens 18 of the present embodiment, it is preferable that a diffractive optical element surface is formed on the lens surface of the first lens 13 facing the image surface side or the lens surface of the second lens 14 facing the image surface side. By forming the diffractive optical element surface in this way, chromatic aberration can be corrected favorably.

Here, the shape of the diffractive optical element surface will be given by Formula 2.

$$\phi(\rho) = (2\pi/\lambda_0)(C1\rho^2 + C2\rho^4)$$

$$Y = \rho \times (\text{normalized radius}) \qquad [\text{Formula 2}]$$

Where, in Formula 2, $\phi(\rho)$ indicates the phase function, Y indicates the height from the optical axis, Cn indicates nth-order phase coefficient, and $\lambda_0$ indicates design wavelength. Meanwhile, X is determined by shape converting $\phi(\rho)$ at M-th diffraction order.

It is preferable that also in the photography lens 18 of the present embodiment, similarly to the photography lens 6 of the first embodiment, each of the first lens 13 to the third lens 15 is a plastic lens. If the first lens 13 to the third lens 15 are plastic molded products, molding of the first lens 13 to the third lens 15, including providing an aspherical shape and a diffractive optical element surface, can be carried out readily. In addition, it is also advantageous in terms of the material cost, and by extension the manufacturing cost.

It is preferable that the photography lens 18 of the present embodiment also satisfies the conditional expression (4).

Example 3

Hereinafter, the photography lens of the present embodiment will be described more specifically by way of a specific example.

Table 7 shows a specific numeral example of a photography lens in this example. The photography lens 18 shown in FIG. 5 is configured on the basis of the data shown in Table 7.

TABLE 7

| Surface number | r (mm) | d (mm) | n | ν |
|---|---|---|---|---|
| Object | | Infinite | | |
| Aperture stop | ∞ | 0.00 | — | — |
| First surface | 1.512 | 0.665 | 1.5247 | 56.38 |
| Second surface* | 10.545 | 0.774 | — | — |
| Third surface | −1.661 | 0.587 | 1.607 | 27.59 |
| Fourth surface | −6.257 | 0.296 | — | — |
| Fifth surface | 1.471 | 1.044 | 1.5247 | 56.38 |
| Sixth surface | 1.854 | 0.500 | — | — |
| Seventh surface | ∞ | 0.500 | 1.5168 | 64.2 |
| Eighth surface | ∞ | 0.320 | — | — |
| Image surface | ∞ | — | — | — |

Table 8 shows aspherical coefficients (including conic constant) of the photography lens in this example.

TABLE 8

| | First surface | Second surface * | Third surface | Fourth surface | Fifth surface | Sixth surface |
|---|---|---|---|---|---|---|
| κ | −1.1842E+00 | 0.0000E+00 | 1.3865E+00 | 2.1829E+01 | −5.3708E+00 | −3.7489E+00 |
| A4 | 3.6024E−02 | −2.5551E−02 | −6.6772E−02 | −3.4438E−01 | −2.5072E−01 | −1.0820E−01 |
| A6 | −4.4778E−03 | −2.2579E−02 | 7.7019E−02 | 4.4807E−01 | 1.5141E−01 | 2.8443E−02 |
| A8 | 8.3666E−03 | −3.2694E−02 | 5.9693E−02 | −2.4730E−01 | −4.5315E−02 | −4.1497E−03 |
| A10 | −4.4801E−02 | −5.2311E−02 | −1.6460E−01 | 6.7996E−02 | 3.2066E−03 | −8.6143E−05 |

As shown in Table 8, in the photography lens 18 in this example, all the lens surfaces of the first lens 13 to the third lens 15 are aspherical. It should be noted, however, that the photography lens 18 is not necessarily limited to this configuration as long as at least one of the lens surfaces of the first lens 13, one of the lens surfaces of the second lens 14 and both lens surfaces of the third lens 15 are aspherical.

In Tables 7 and 8, the surface to which a * mark is given (second surface: the lens surface of the first lens 13 facing the image surface side) is a diffractive optical element surface. Table 9 shows a specific numerical example of the diffractive optical element surface.

TABLE 9

| Design wavelength | 546.07 nm |
|---|---|
| Diffraction order | 1 |
| Normalized radius | 1 |
| C1 | −7.5057631E−03 |
| C2 | 1.1966376E−03 |

As described above, in the photography lens 18 in this example, the diffractive optical element surface is formed on the lens surface of the first lens 13 facing the image surface side. It should be noted, however, that the photography lens 18 is not necessarily limited to this configuration. Similar effects can be obtained even if the diffractive optical element surface is formed on the lens surface of the second lens 14 facing the image surface side.

Table 10 shows the F number Fno, the focal length f (mm) of the entire optical system, the angle of view 2 ω (°) the optical total length measured in terms of air TL (mm), and the values of the respective conditional expressions (1) to (4) of the photography lens 18 in this example.

TABLE 10

| Fno | 3.0 |
|---|---|
| f (mm) | 3.90 |
| 2ω (°) | 59.5 |
| TL (measured in terms of air) (mm) | 4.51 |
| Conditional expression (1) f1/f | 0.81 |
| Conditional expression (2) f2/f | −1.00 |
| Conditional expression (3) r21/((n2 − 1) * f) | −0.70 |
| Conditional expression (4) TL/f | 1.16 |

Figure 6A:
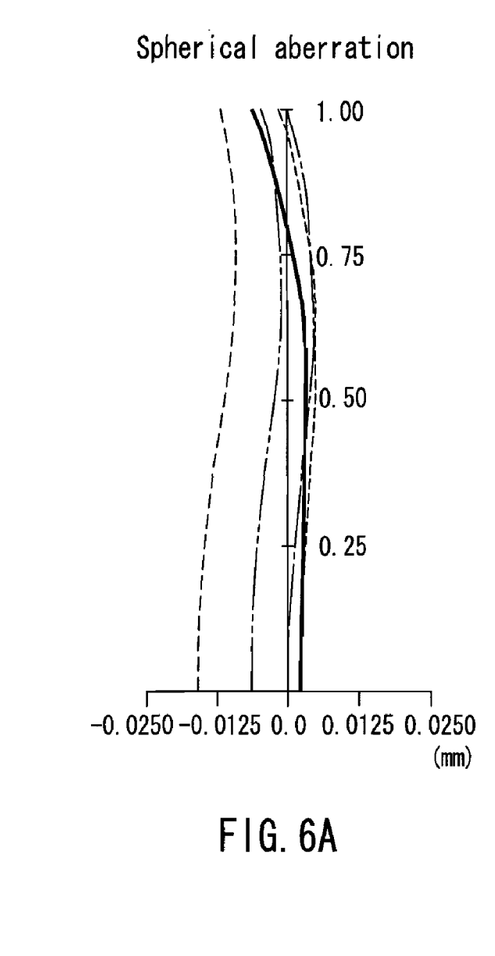
FIG. 6A is a graph showing spherical aberration (longitudinal chromatic aberration)
Figure 6B:
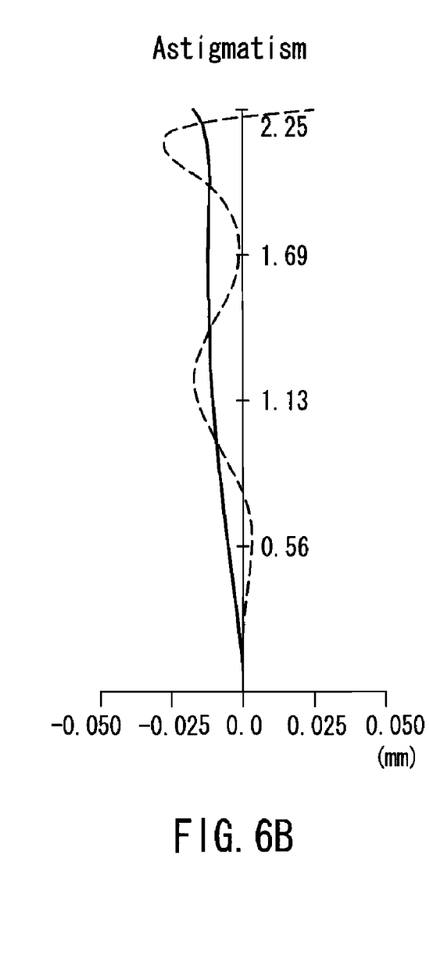
FIG. 6B is a graph showing astigmatism and FIG. 6C is a graph showing distortion.
Figure 6C:
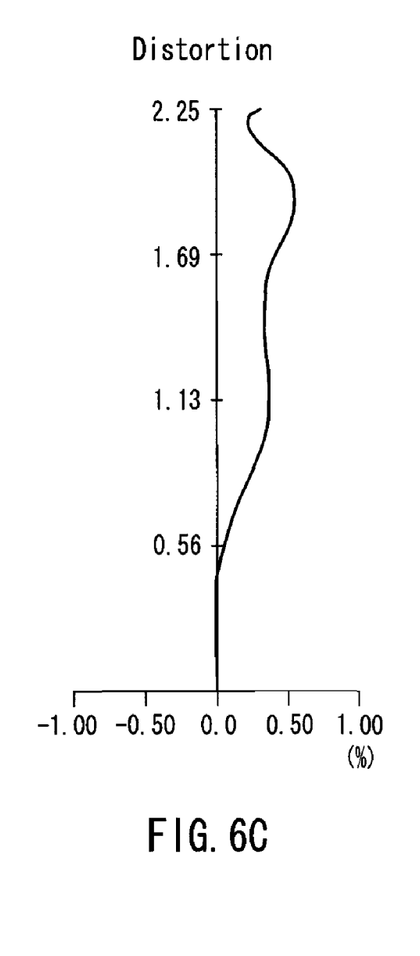

FIG. 6 shows aberration graphs of the photography lens in this example. FIG. 6A is a graph showing spherical aberration. A solid line indicates values at the g line, a short dashed line indicates values at the F line, an alternate long and short dashed line indicates values at the e line, an alternate long and two short dashed line indicates values at the d line, and a long dashed line indicates values at the C line. FIG. 6B is a graph showing astigmatism, and a solid line indicates a sagittal field curvature and a dashed line indicates a meridional field curvature. FIG. 6C is a graph showing distortion. A graph of longitudinal chromatic aberration is identical to FIG. 6A showing spherical aberration.

As is evident from the aberration graphs shown in FIG. 6, various aberrations are corrected favorably, and thus the photography lens 18 in this example is compatible with a high pixel imaging element of a megapixel or more. In addition to this, if the results shown in Table 10 are taken into consideration, it is apparent that a bright photography lens having high performance and an F number of 3.0 is obtained. The photography lens can be small, thin and it can be manufactured at low cost. Furthermore, the photography lens is compatible with a high pixel imaging element of a megapixel or more incorporated in a small mobile product such as a mobile phone.

INDUSTRIAL APPLICABILITY

The present invention provides a small and thin photography lens manufactured at low cost and compatible with a high pixel imaging element of a megapixel or more. Thus it is particularly useful in the field of small mobile products such as mobile phones equipped with an imaging element where an increase in the number of pixels is desired.

The invention claimed is:

1. A photography lens comprising: an aperture stop; a first lens having positive refractive power, and at least one of lens surfaces is aspherical; a second lens having negative refractive power, and at least one of lens surfaces is aspherical; and a third lens having positive refractive power, and both lens surfaces are aspherical, arranged in that order from an object side to an image surface side, wherein the first lens is configured as a meniscus lens whose lens surface facing the object side is convex with higher refractive power than a lens surface facing the image surface side, a lens surface of the second lens facing the object side is concave, the third lens is configured as a meniscus lens whose lens surface facing the object side is convex, and when f indicates a focal length of an entire optical system, f1 indicates a focal length of the first lens, f2 indicates a focal length of the second lens, r21 indicates a radius of curvature of the lens surface of the second lens facing the object side, and n2 indicates a refractive index of the second lens, the following conditional expressions (1) to (3) are satisfied:

$$0.8 < f1/f < 0.9 \quad (1)$$

$$-1.0 < f2/f < -0.7 \quad (2)$$

$$-1.0 < r21/((n2-1) \cdot f) < -0.7. \quad (3)$$

2. The photography lens according to claim 1, wherein a diffractive optical element surface is formed on the lens surface of the first lens facing the image surface side or the lens surface of the second lens facing the image surface side.

3. The photography lens according to claim 1, wherein each of the first to the third lenses is a plastic lens.

4. The photography lens according to claim 1, wherein when TL indicates a total length of the optical system, the following conditional expression (4) is satisfied:

$$TL/f < 1.25. \quad (4)$$

5. A photography device comprising: an imaging element; and a photography lens for forming an optical image for the imaging element, wherein a photography lens according to claim 1 is used as the photography lens.

* * * * *